Figure 1:
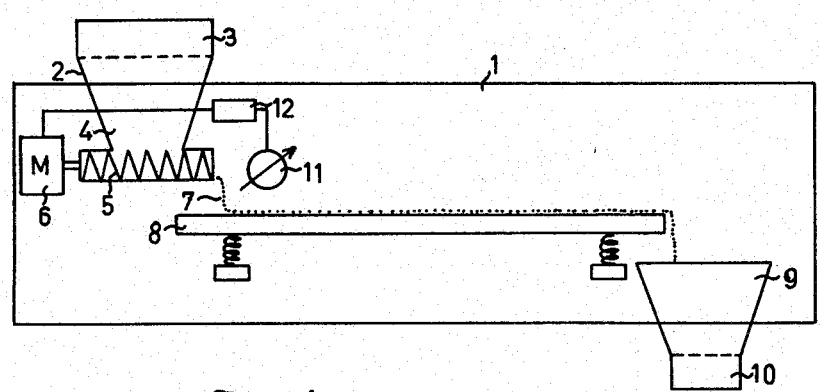

United States Patent [19]

Bouldoires et al.

[11] 3,882,610

[45] May 13, 1975

[54] FREEZE-DRYING PROCESS AND APPARATUS

[75] Inventors: Jean-Pierre Bouldoires, La Tour-De-Peilz; Jacques Bally, Savigny, both of Switzerland

[73] Assignee: Societe d'Assistance Technique Pour Produits, Nestle S.A., Lausanne, Switzerland

[22] Filed: Jan. 28, 1974

[21] Appl. No.: 436,959

[30] Foreign Application Priority Data
Feb. 5, 1973 Switzerland.......................... 1591/73

[52] U.S. Cl............................................. 34/5; 34/92
[51] Int. Cl.............................................. F26b 5/06
[58] Field of Search........................................ 34/5, 92

[56] References Cited
UNITED STATES PATENTS
3,234,661  2/1966  Nerge ........................................ 34/5
3,477,137  11/1969  Gelder ...................................... 34/92

*Primary Examiner*—John J. Camby
*Attorney, Agent, or Firm*—Watson, Leavenworth, Kelton & Taggart

[57] ABSTRACT

In a continuous freeze-drying process, the feed rate of material to be dried is continuously adjusted to maintain a substantially constant pressure within the drying chamber. An apparatus for carrying out the process is also disclosed.

7 Claims, 2 Drawing Figures

FREEZE-DRYING PROCESS AND APPARATUS

The present invention is concerned with processes and apparatus for continuous freeze-drying.

Various procedures have been proposed for controlling freeze-drying installations for the purpose of automatically maintaining the optimum conditions for subliming the ice contained in the particles of product being dried. The conditions involved are the temperature and pressure which determine the state of the particles and which need to be such that the ice sublimes rapidly without melting, even locally, and without the product becoming overheated. Known processes for example provide for control of a functional element of the installation by a physical quantity related to the moisture content or to the state of dryness of the particles. The physical quantities in question in these processes may be the dielectric properties of the particles, namely the loss factor and the dielectric constant, the surface temperature of the particles, and the pressure. The functional elements subjected to control are, alternately, or, even simultaneously, the condenser, the heating or heat-exchange means, and the conveying means for the material. Such processes and apparatus are subject to drawbacks of two kinds, namely the slow speed of response of an element to actuating signals emitted by an electronic control device or the lack of proportion between the means and the energy employed for modifying the movement or the state of an element. It is sufficient, for example, to refer in this respect to the thermal inertia of a heater or a condenser, to appreciate the slowness of the response, or to the mass and complexity of a vibrating conveyor, which presents considerable practical difficulties of control.

The present invention provides a freeze-drying process, comprising continuously feeding frozen product into a freeze-drying chamber and withdrawing dried product therefrom, in which the pressure is measured at at least one point within the chamber and the rate of feed of frozen product into the chamber is continuously adjusted to maintain the measured pressure substantially constant. The invention also provides a freeze-drying apparatus, comprising means for continuously feeding frozen product into a drying chamber and means for measuring the pressure at at least one point within the chamber, in which means is provided for controlling the feed rate of the feeding means as a function of the pressure measured by the pressure measuring means.

The present process and apparatus provide for good response times during operation. Thus, pressure variations may be followed with gauges having extremely short response times, of the order of 0.01 second, for example, diaphragm gauges, whereas the inertia of suitable feeding means such as a screw is very much less than that of a conveyor.

It is also desirable that the pressure be determined close to the point of entry of the product into the drying chamber, so that irregularities in the product feed rate might be allowed for more quickly.

Moreover, it should be noted that the choice of the total pressure as the physical variable to be maintained substantially constant affords a particular advantage over other variables in that allowance is made not only for the moisture content of the product to be dried, as reflected by the pressure of water vapour in the drying chamber, but also for the total partial pressure of non-condensables which may be inside the chamber, for example as a result of a leak, or following a changeover of condensers or product supply bins. The pressure of non-condensables may be significant, and could cause melting of the frozen product.

The control arrangement according to the invention also provides for the yield to be substantially increased as the feed rate of the product is not limited to a constant value, but is maintained as close as possible to the maximum capacity of the installation.

The accompanying drawing illustrates, by way of example, one preferred embodiment of the apparatus in accordance with the invention.

Figure 2:
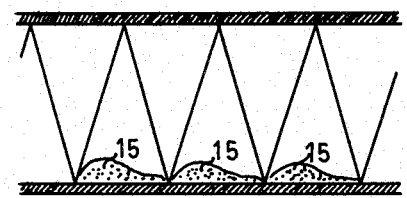

FIG. 1 is a schematic sectional view showing the principal functional elements of the apparatus and FIG. 2 represents the distribution of a product being conveyed by a feed screw.

The apparatus shown in FIG. 1 comprises a vacuum drying chamber 1 (means for creating a vacuum are not shown) into which the frozen product is introduced by a feeding device 2. The feeding device 2 comprises an inlet air-lock 3 and a hopper 4 supplying a feed screw 5 driven by a motor 6. Frozen product 7 is delivered by the feeding screw 5 onto a heated vibrating conveyor 8. Dried product is delivered by the conveyor 8 into a discharge hopper 9 which terminates into an outlet air-lock 10. The total pressure in the drying chamber 1 is measured by a diaphragm gauge 11 located close to the point of entry of the product into the chamber. The gauge 11 emits a signal which is used for varying the speed of rotation of the feed screw 5 by way of an electronic control means 12 which regulates the speed of rotation of the motor 6 driving the screw 5.

Preferably, the control means 12 includes a governor for limiting the maximum speed of rotation of the motor 6, so that screw 5 is not rotated at too high a speed in case of a product supply failure, which may be caused by bridging in the hopper 4. Rotation of the screw at an excessive speed could lead to a surge of a large amount of product when the supply is restored.

In operation, the speed and temperature of the conveyor are maintained constant, at optimum values determined by preliminary trails. The vacuum source, including condensers and pumping means for non-condensables, are operated conventionally. The condenser temperature is chosen having regard to the nature of the product. The optimum value at which the pressure is held substantially constant, that is the reference pressure $p_c$, is determined as a function of the nature of the product, the solvent, and of the desired final moisture content. This reference pressure $p_c$ as well as an upper limiting value of the speed of rotation of the motor, are set in the controller 12 before the start of the drying operation.

A diaphragm gauge is preferred for measuring the pressure, because such a gauge functions independently of the nature of the gas and thus always measures the total pressure. Moreover, such a gauge gives a linear response as a function of the total pressure, since the diaphragm is not displaced by more than a small amount (a few microns) and as indicated previously its response time is extremely short (of the order of 0.01 second). For example, it has been observed with the control system shown in FIG. 1 that the speed of rotation of the feed screw oscillates periodically about an approximately constant average speed, corresponding to the reference pressure, and that these oscillations coincide, but in the opposite sense, with the regular pressure oscillations caused by the fact that the feed screw 5 delivers the product in packets 15, FIG. 2. A recording made during a drying operation with the feed screw rotating at 4 revolutions per minute shows, for example, that the pressure measured by the control gauge 11, a diaphragm gauge, oscillated at the frequency of 4 cycles per minute between 0.20 and 0.23 torr, while the pressure determined by a safety gauge of the thermocouple type, remained constant. Recordings of the speed of rotation of the feed screw, as determined by a dynamo tachometer connected to the shaft of the screw, also show that the speed varies, but inversely, with the pressure variations determined by the diaphragm gauge.

The invention is further illustrated by the following example: a continuous freeze-drying apparatus is provided with two feed screws for frozen product, one of which (A1) is controlled as described by the pressure within the chamber, measured by a diaphragm gauge, whereas the other screw (A2) rotates at a speed which is controlled manually, with an overriding safety device. Each screw alternatively feeds granulated frozen coffee extract to the heated conveyor during about 1 hour. The normal operating pressure is about 0.20 torr, and the throughput about 500 kg/hour. Each screw is supplied by its own supply bin, so that at each changeover of screw a fresh bin of frozen product is put on stream.

A recording is made continuously of the speeds of rotation of the screws and the pressure in the chamber as measured by the diaphragm gauge controlling screw A1. The recording shows that during operation of screw A1 the pressure oscillates regularly, with small amplitude, about a substantially constant value which is higher than the average pressure obtaining in the chamber during operation of screw A2. In the second case (screw A2) the pressure variations are irregular and of greater amplitude, which means that screw A2 cannot be driven as fast as screw A1. Consequently, when screw A2 is in operation, the operating pressure is lower than the reference pressure set on the control device during operation of screw A1. It is also observed that at each changeover of supply bin the set operating pressure is attained more rapidly with screw A1 than with screw A2.

We claim:

1. In a freeze-drying process, comprising continuously feeding frozen product into a freeze-drying chamber and withdrawing dried product therefrom, the improvement which comprises measuring the pressure within the chamber at at least one point therein, and continuously adjusting the rate of feed of frozen product into the chamber to maintain the measured pressure substantially constant.

2. A process according to claim 1, in which the pressure is measured close to the point of entry of frozen product into the chamber.

3. A process according to claim 1 in which the frozen product is fed into the chamber by a rotating screw and adjusting the rate of product feed into the chamber by varying the speed of rotation of the screw.

4. A freeze-drying apparatus, comprising means for continuously feeding frozen product into a drying chamber, and means for measuring the pressure at at least one point within the chamber, there further being means for controlling the feed rate of the feeding means as a function of the pressure, the controlling means being electrically connected between the pressure measuring means and the feeding means.

5. An apparatus according to claim 4 in which the means for feeding frozen product includes a feed screw and means for rotating the screw, the controlling means being connected between the rotating means and the pressure measuring means.

6. An apparatus according to claim 5 in which the controlling means includes means for limiting the maximum speed of rotation of the feed screw.

7. An apparatus according to claim 4 in which the pressure measuring means includes a diaphragm gauge.

* * * * *